Feb. 28, 1961 T. H. JACKSON, JR 2,972,812
LIGHT CHOPPER
Filed March 14, 1949
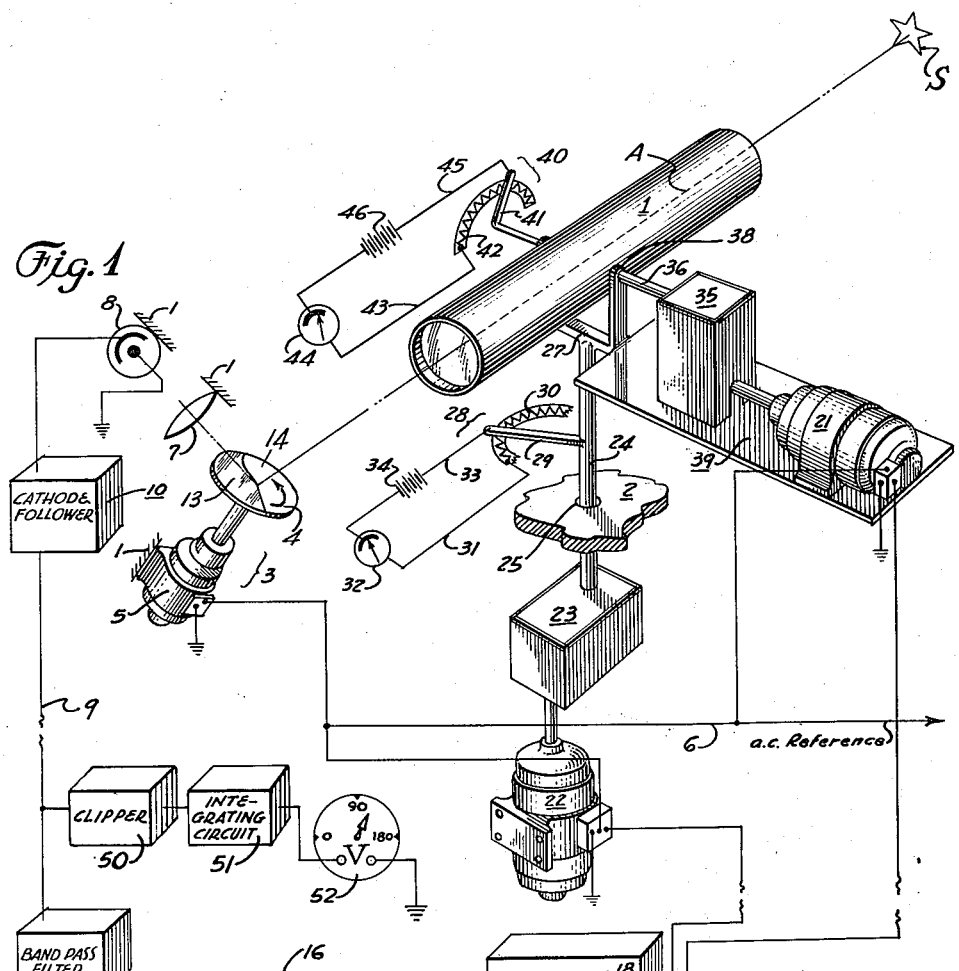
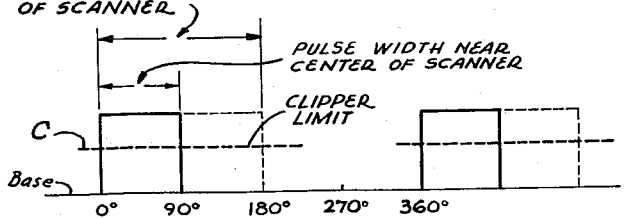
INVENTOR.
THIRSTON H. JACKSON Jr.
BY Hubert E. Metcalf
ATTORNEY United States Patent Office 2,972,812
Patented Feb. 28, 1961

2,972,812
LIGHT CHOPPER

Thirston H. Jackson, Jr., Los Angeles, Calif., assignor to Northrop Corporation, a corporation of California Filed Mar. 14, 1949, Ser. No. 81,221

23 Claims. (Cl. 33—61)

This invention relates to light trackers, and more particularly automatic star trackers employing a novel means and method of error detecting.

Star trackers are desirable for automatically establishing star lines of sight needed for obtaining a relationship in space between the tracking means and the selected star as a part of essential information required to perform automatic celestial navigation or in any other manner where an instantaneous or continual reference to one of the heavenly bodies is required.

The tracking of a star in two coordinates, namely azimuth and elevation, requires that two error signals must be sensed by the detector in order to return the star image to a null position on the detector.

Instead of providing two focal image planes and two detectors, each properly aligned in the optical system of the tracker, to determine two coordinate error sensing, it is highly desirable to have a single error-signal detecting device whose output signal can be adapted to determine both the azimuth and elevation error and magnitude thereof.

It is therefore an object of the present invention to provide a novel scanning means and method of modulating a single error signal into useful periodic signals.

It is another object of the invention to provide a novel means and method of scanning a single error signal to provide the basis for obtaining a two coordinate signal.

It is still another object of the present invention to provide a novel means and method of forming signals indicative of both the direction and magnitude of deviation of a star image from the center of the field of view of the tracking telescope.

It is still another object of the present invention to provide a visual means of indicating the magnitude of deviation of a star image from the center of field of view of the tracking telescope.

In one preferred form of the invention the light from an interesting star is picked up by the objective of the telescope which focuses the star light onto a rotary light chopper fixed to rotate in the focal plane of the telescope with its center intersected by the optic axis thereof. Any deviation of the star light rays from coincidence with the optic axis results in the star image being reflected by the partially reflective rotary light chopper as pulses of light, thus modulating the star image into light pulses recurring at a reference frequency that is identical to chopper rotation. Means are provided to adapt these light pulses into usable servo signals to be used by suitable driving means to reorient the optical system so as to return the star lines to coincidence with hte optical axis. Means are also provided in a parallel circuit for visually indicating the magnitude of the deviation of the image from the optical axis.

The above and other objects and advantages of the present invention will be more apparent from the ensuing description of a preferred form of the invention shown in the drawings in which:

Figure 1 is a perspective view of a star tracker and servo control network embodying the present invention.

Figure 2 is a diagram showing the nature of the error signal emitted by the light chopper.

Figure 3 is a perspective view of a modified scanning disc.

In a preferred embodiment of the invention, referring to the drawing, a telescope 1 is mounted on a gyrostabilized platform 2 in a moving vessel, for example, and is pointed in the direction of the light to be sought, such as light from a star S, to make the tracking axis A of the telescope 1 generally coincident with the sight line to the star. The objective of the telescope 1 focuses the image of the star onto a rotary light chopper 3 rigidly connected to move with the body of the telescope 1. The rotary light chopper 3 consists of a glass disc 4 driven by a synchronous motor 5 off reference frequency line 6. Glass disc 4 is positioned with its plane at 45° to the tracking axis of the telescope and with the center of the disc 4 intersected by the tracking axis thereof. The plane of the glass disc 4 has a reflecting aluminized area 13 and a non-reflecting area 14, the boundaries therebetween consisting of the combination of a straight line and a spiral of Archimedes meeting at the exact center of the disc 4. The rotating glass disc 4 thus modulates any deviation of the image from the center thereof into light pulses. These light pulses, caused by reflection of the star images from the aluminized area 13 of disc 4, are then passed through a collimator lens 7. The purpose of the collimator lens 7 is to direct the light pulses onto the same area of the cathode of a photomultiplier tube 8 to provide a consistent photocell output. The lens 7 and tube 8 are likewise mounted to move with the body of the telescope 1.

The photocell 8 output is a feeble high impedance signal which is fed directly into a cathode follower 10 whose output is a low impedance, amplified signal with the same characteristics of the original photocell signal. This arrangement reduces the electrostatic and electromagnetic effects due to the circuits in the vicinity to inconsequence and furthermore makes it possible to convey the electrical signal through a cable 9 of substantial length, thus enabling the remaining components of the system to be located at some isolated area so that the entire mass of the system need not be swung by the servo motors. Cable 9 branches off into two parallel circuits, the power amplifying circuit and the visual error indicating circuit. The latter circuit consists of a clipper 50, integrating circut 51, and a D.C. voltmeter 52 connected to ground. The operaton of this circuit will be clearly explained in the ensuing discussion. The power amplifying circuit consists of two parallel channel leads, the azimuth and elevation channel leads 16 and 17, respectively, containing therein azimuth and elevation amplifiers 18 and 19, respectively. As the signal enters the power amplifier circuit it passes through a 50-60 c.p.s. band pass filter 12 which eliminates spurious and undesirable frequencies. In passing into elevation amplifier 19 the signal is subjected to a phase displacement by a phase shift network 20 such that the elevation channel power signal is displaced from the azimuth channel power signal by ninety electrical degrees. The output signals from the elevation and azimuth amplifiers appear as two phase-displaced power signals to an elevation and azimuth servo motors 21 and 22, respectively. These motors are two-phase balancing motors in which the above signal voltages are impressed on one field, referred to as the control field, and line reference voltage from reference line 6 is impressed on the second field, referred to as the reference field. The azimuth servo motor 22 drives through gear box 23 to rotate a vertical shaft 24 supported by bearing 25 on platform 2. Vertical shaft 24 is connected to fork mount 27 supporting telescope 1. This mounting enables the telescope 1 to be rotatable in azimuth.

A means for indicating the azimuth angle of the tracked star with respect to a given reference direction, such as magnetic north, is provided by a potentiometer device 28, only a portion of which is shown, having a contact arm 29 which is rigidly attached to vertical shaft 24 and adapted for movement therewith. The contact arm 29 is slidable over resistance 30, one extremity of which is connected by lead 31 to an azimuth ammeter 32 which may be calibrated as a function of telescope azimuth. The contact arm 29 is also connected to azimuth ammeter 32 by lead 33, there being a source of electric energy 34 in the last mentioned lead.

The elevation servo motor 21, actuated by the phase displaced power signal, drives an elevation shaft 36 through an elevation gear box 35. Elevation shaft 36 rests in fork bearing 38 and is rigidly attached to telescope body 1 to produce a change in telescope elevation when rotated. A support 39 for the elevation servo motor 21 and elevation gear box 35 is rigidly connected to fork mount 27 to rotate in conjunction with telescope 1 about the axis of rotation of vertical shaft 24.

The elevation indicating arrangement for the telescope, which records the tracked star elevation angle with respect to the plane of the gyro-stabilized platform 2, is obtained by means of a second potentiometer device 40 analogous to the one previously described. Arm 41, rigidly attached to elevation shaft 36, is slidable over a potentiometer resistance 42. Lead 43 connects one end of the resistance to elevation ammeter 44. Lead 45 connects the arm 41 to the elevation ammeter 44, there being a source of electrical power 46 in the latter lead.

This completes the description of the preferred embodiment of the invention showing a means and method of tracking a star by use of a novel, non-interfering error detecting scanner.

The torque characteristics of the two-phase drive motors used in the tracking system vary as a function of the phase relation of the voltages impressed on their fields. When alternating voltages impressed on their reference and control fields respectively become 90 or 270 electrical degrees out of phase, the torque on their rotor in both instances reaches a maximum, but in opposite direction; and when 0 or 180 electrical degrees out of phase, the torque becomes zero.

By connecting the reference fields of the drive motors to the same reference frequency controlling the synchronous motor driving the rotary chopper, a fixed relationship is established for the output signal frequency, which has a phase characteristic determined by the direction of the image deviation from null, so that when impressed on the control fields of the motors, the motors are actuated in accordance with the phase relationship of the fields and in such a manner as to return the image to null.

The fixed azimuth and elevation null axes in the focal plane of the telescope correspond to the diameters therein determined by the trace of the image formed by swinging the telescope, from the null position at the center of the glass disc, about each of its mounting axes.

The aluminized area of the glass disc must be properly oriented in respect to the fixed azimuth and elevation coordinate axes so that, for instance, the radius formed by the straight edge of the aluminized area of the glass disc coincides with the azimuth null axis at the instant of 0 electrical degrees of the reference voltage.

Assume, for example, that the tracking system maintains its correct azimuth angle but deviates from the desired elevation angle. The error signal pulse for this case, which is at the same frequency as the reference frequency is such that it originates either in phase with or 180 electrical degrees out of phase with the azimuth motor reference frequency and this condition, as explained above, causes no rotation in that motor. However, this same error signal pulse when shifted through 90 electrical degrees in the elevation channel lead is made to originate 90 or 270 electrical degrees out of phase with the elevation motor reference frequency and in such a manner as to rotate the elevation motor to cause the tracking system to null on the elevation axis.

Thus, the phase relationship between the light pulses and the A.C. supply line used as a reference indicates the direction of the star image from the center of the rotary scanner. This phase relationship, furthermore, is utilized, as has been described, in a suitable null-seeking servo system to control the telescope to follow the interesting star.

Referring back to the glass disc 4 whose light absorbing area 14 is bounded by a straight edge and a spiral of Archimedes, this design feature of the chopper enables the modulated error pulse signal to be both a function of the direction and magnitude of the deviation of the image from a center or null position of the disc.

The mathematical characteristics of a spiral of Archimedes being understood, it can be seen that the duration of each signal pulse is directly proportional to the distance of the image from the center of the disc; that is to say, the cut-off of each light pulse occurs in such a manner that the light pulse width is directly proportional to the distance, from the center of rotation, at which the image strikes the disc, this distance constituting the magnitude of the tracking error. For this particular embodiment, as shown in Figure 2, the error pulse width is 90 electrical degrees when the image first deviates from the center of the disc and the pulse width linearly increases to 180 electrical degrees as the image deviation approaches the circumference of the disc. The duration or width of the pulse being small near the center of the disc insures that for small deviations a relatively small power signal is impressed on the control field of the restoring drive motor, thus eliminating overshooting of the null position.

As previously noted in Figure 1 a parallel circuit to the power amplifying network is connected at the output line 9 from the cathode follower 10. This circuit provides a visual means for indicating the magnitude of the deviation of the image from the null or center of scanner disc 4. Since the electrical magnitude of the signal emitted by the phototube 8 is a function of the brightness of the star being tracked, a clipper 50 is provided in the parallel circuit which insures that the clipper clips the amplitude of the signal above that produced by the weakest star to be tracked. Dashed line C in Figure 2 shows the amplitude limit of the signal passed by the clipper 50. This clipped signal is then passed through a conventional integrating circuit 51 which integrates the pulse and, as can be seen by Figure 2, the magnitude of the D.C. voltage read on voltmeter 52 is thus independent of the amplitude of the pulse, being only a function of the pulse width.

Voltmeter 52 can thus be calibrated in any convenient manner and thus provides a novel means for giving a continual visual indication of the magnitude of the image deviation from null.

It is to be distinctly understood that the angular relation of the straight line and the spiral of Archimedes as shown in the drawing of the disc is not limited thereto but can have any form as long as they meet at the exact center of the disc 4. Moreover, for instance, it is conceivable that the curvature of the spiral can be equally divided between the two boundaries from the center of the disc, as shown in Figure 3, where the reflecting area is indicated at 13' thus resulting in a heart-shaped light absorbing or non-reflecting area 14' which will satisfy the desired scanner characteristics.

It is apparent that the boundaries between the light absorbing or non-reflecting area and the reflecting area may have any configuration just so long as they satisfy the two requirements: (a) that they define the surface area of the disc in such a manner as to provide distinct pulses of light and (b) that the width of the pulses of light so produced vary in some known linear or nenlinear way (mathematically expressible) with the deviation of the image from the center of the disc; thus it follows that for any given configuration, the distribution of light reflecting and non-light reflecting areas on the surface of the disc must satisfy a known and arbitrary mathematical function, said function having a number of possible useful solutions.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A light chopper comprising a scanner, means for focusing an image of a point source of radiant energy on said scanner, means for rotating said scanner, said scanner being divided into two portions having different radiant energy responsive areas by two lines generally radial in extent and meeting at the center of said disc, one of said lines being curved to provide arc angles in said portions differing at different distances from said center, and means for creating electrical signals from radiant energy modulated by scanner rotation.

2. A light chopper comprising a scanner, means for focusing an image of a point source of radiant energy on said scanner, means for rotating said scanner, said scanner being divided into two halves having different radiant energy responsive areas, each of said halves being divided into two quadrants, two adjacent quadrants of different radiant energy responsive areas being joined by a straight line, the two remaining quadrants being joined by a curved line, and means for creating electrical signals from radiant energy modulated by scanner rotation.

3. Apparatus in accordance with claim 2 wherein means are provided to rotate said scanner in synchronism with and in a given phase relation to a given reference frequency.

4. Apparatus in accordance with claim 2 wherein said curved line is an Archimedes spiral to provide a signal whose duration is a linear function of the distance of said image from the junction of said quadrants.

5. A light chopper comprising a scanner disc, means for focusing an image of a point source of light on said disc, said disc positioned at an angle to the incident image beams, the plane of said disc being divided into a non-reflective and a reflective area, said areas being divided by two generally radial lines meeting at the center of said disc, at least one of said lines being curved, a reference frequency supply, a synchronous motor for rotating said disc around the center thereof at said reference frequency whereby any deviation of said image from said disc center is reflected into periodic light signals at said reference frequency, and means for translating said periodic light signals into electrical signals.

6. Apparatus in accordance with claim 5 wherein the relative arc length of said reflecting portion, as compared to the relative arc length of said non-reflecting portion, increases with increasing values of the radial distance from the center of said disc.

7. Apparatus in accordance with claim 5 wherein means are provided to compare the phase of said periodic electrical signals with the phase of said reference frequency as a function of the direction of deviation of said image from said disc center.

8. Apparatus in accordance with claim 5 wherein said reflective area is bounded by a straight line and an Archimedes spiral meeting at the exact center of said disc.

9. Apparatus in accordance with claim 5 wherein said reflective area is bounded by two lines meeting at the exact center of said disc, both of said lines being curved, the rate of curvature of said lines being such that the duration of said periodic light signals is directly proportioned to the distance of said image from said disc center.

10. Apparatus in accordance with claim 9 wherein means are provided to convert said periodic light signals into electrical signals having a positive square wave form, and means for making the phase angle of said electrical wave with respect to said reference frequency, a function of the direction of deviation of said image from said disc center.

11. A star tracker comprising an optical means for focusing the image of an interesting star, a scanner disc positioned in the focal plane of said optical means with its center intersected by the optical axis thereof, an Archimedes spiral and a straight line intersecting at the exact center of said disc and dividing said disc into reflective and non-reflective area, a reference frequency supply, a synchronous motor for rotating said scanner at said reference frequency, said scanner chopping light caused by any deviation of said image from the center thereof into periodic light signals at said reference frequency, means for converting said light signals into periodic electrical signals, and means for driving said optical means to follow said star in accordance with said periodic electrical signals.

12. Apparatus in accordance with claim 11 wherein said optical system is connected to be moved in azimuth by said driving means, and wherein the radius formed by said straight line on said scanner disc is oriented to coincide with the azimuth null axis of said optical system at the instant of zero electrical degrees of said reference frequency.

13. Apparatus in accordance with claim 11 wherein the direction of rotation of said scanner disc is such that said reflective area on said disc starts to reflect said image with the area edge formed by the straight line on said disc.

14. A star tracker comprising a telescope focusing the image of an interesting star, a means for orientating said telescope in azimuth and elevation, a scanner disc mounted to move with the telescope in the focal plane thereof and positioned with its center intersected by the tracking axis thereof, a reference frequency supply, a synchronous motor for rotating said scanner disc at said frequency, an Archimedes spiral and a straight line intersecting at the exact center of said disc and dividing said disc into reflective and non-reflective areas, said scanner chopping light caused by any deviation of said image from the center thereof into light pulses recurring at said reference frequency, a photomultiplier tube for converting said light pulses into electrical pulses, means for comparing the phase of said electrical pulses with the phase of said reference frequency, and means for energising said orientating means in accordance with the resultant of said phase comparison to track said star.

15. A star tracker comprising an optical means for focusing the image of an interesting star, a scanner disc positioned in the focal plane of said optical means with its center intersected by the optical axis thereof, an Archimedes spiral and a straight line intersecting at the exact center of said disc and dividing said disc into reflective and non-reflective areas, a reference frequency supply, a synchronous motor for rotating said scanner at said reference frequency, said scanner chopping any deviation of said image from the center thereof into periodic signals recurring at said reference frequency, and means for visually indicating in accordance with said periodic signals the magnitude of deviation of said image from said disc center.

16. A star tracker comprising an optical means for focusing the image of an interesting star, a scanner disc positioned in the focal plane of said optical means with its center intersected by the optical axis thereof, an Archimedes spiral and a straight line intersecting at the exact center of said disc and dividing said disc into reflective and non-reflective areas, a reference frequency supply, a synchronous motor for rotating said scanner at said reference frequency, said scanner chopping any deviation of said image from the center thereof into periodic light signals recurring at said reference frequency, means for translating said light signals into periodic electrical signals, a movable member, and means for moving said member in accordance with said periodic electrical signals.

17. A star tracker comprising an optical means for focusing the image of an interesting star, a scanner disc positioned in the focal plane of said optical means with its center intersected by the optical axis thereof, an Archimedes spiral and a straight line intersecting at the exact center of said disc and dividing said disc into reflective and non-reflective areas, an A.C. reference frequency supply, a synchronous motor for rotating said scanner at said reference frequency, said scanner chopping any deviation of said image from the center thereof into periodic signals recurring at said reference frequency, and means for visually indicating in accordance with said periodic signal the magnitude of deviation of said image from said disc center, said indicating means comprising an electrical network consisting of a photo-multiplier tube for converting said periodic light signals into periodic electrical signals, a clipper for passing only a desired fixed amplitude of said electrical signal, an integrating circuit for the resulting electrical signal, and a D.C. voltmeter for visually indicating in accordance with said integrated signal the magnitude of deviation of said image from said disc center.

18. A light chopper comprising a scanner, means for focusing an image of a point source of radiant energy on said scanner, means for rotating said scanner around a control point, said scanner being divided by a line passing through said control point into two portions having different radiant energy responsive areas, and means for creating electrical signals from radiant energy modulated by scanner rotation, said dividing line being determined by a mathematical equation, said portions so divided having arc lengths relative to each other which vary as a function of the radial distance to the center of said scanner.

19. Apparatus in accordance with claim 18 wherein said dividing line is curved on both sides of said control point.

20. A light chopper comprising a scanner, means for focusing an image of a point source of radiant energy on said scanner, means for rotating said scanner around a control point, said scanner being divided by a line passing through said control point into two portions having different radiant energy responsive areas, and means for creating electrical signals from radiant energy modulated by scanner rotation, said dividing line being determined by a mathematical equation, said portions so divided having arc lengths relative to each other which vary linearly with the radial distance from the center of said scanner.

21. Apparatus in accordance with claim 20 wherein said dividing line is curved on both sides of said control point.

22. A light chopper comprising a scanner, means for focusing an image of a point source of radiant energy on said scanner, means for rotating said scanner around a control point, said scanner being divided by a line passing through said control point into two portions having different radiant energy responsive areas, and means for creating electrical signals from radiant energy modulated by scanner rotation, said dividing line being shaped to provide a signal whose duration is a function of the distance of said image from said control point, and wherein said dividing line is curved on one side of said control point and straight on the other side thereof.

23. A light chopper comprising a scanner, means for focusing an image of a point source of radiant energy on said scanner, means for rotating said scanner around a control point, said scanner being divided by a line passing through said control point into two portions having different radiant energy responsive areas, and means for creating electrical signals from radiant energy modulated by scanner rotation, said dividing line being shaped to provide a signal whose duration is a linear function of the distance of said image from said control point, and wherein said dividing line is curved on one side of said control point and straight on the other side thereof.

References Cited in the file of this patent

UNITED STATES PATENTS

| | | |
|---|---|---|
| 1,816,047 | Keuffel | July 28, 1931 |
| 2,462,925 | Verian | Mar. 1, 1949 |
| 2,513,367 | Scott | July 4, 1950 |

FOREIGN PATENTS

| | | |
|---|---|---|
| 33,746 | Holland | Oct. 15, 1934 |